(12) United States Patent
Singh et al.

(10) Patent No.: US 6,366,567 B1
(45) Date of Patent: Apr. 2, 2002

(54) AUTOMATIC DETECTION OF FULL OR HALF DUPLEX CAPABILITY IN A REMOTE NETWORK DEVICE

(75) Inventors: Bharat Kishore Singh, Granite Bay; Bruce Anthony Klemin, Rocklin; Michael Richard James, Roseville, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/129,912

(22) Filed: Aug. 6, 1998

(51) Int. Cl.[7] ............................................ H04L 12/413
(52) U.S. Cl. ...................................... 370/296; 370/445
(58) Field of Search ................................. 370/276, 277, 370/278, 282, 293, 296, 445, 522, 239, 252, 241

(56) References Cited

U.S. PATENT DOCUMENTS 5,311,114 A * 5/1994 Sambamurhty et al. ..... 370/445
5,432,775 A * 7/1995 Crayford .................... 370/296
5,825,755 A * 10/1998 Thompson et al. ......... 390/296

OTHER PUBLICATIONS

IEEE Std 802.3u–1995, IEEE Standards for Local and Metropolitan Area Networks, pp. 235–238.

* cited by examiner

Primary Examiner—Huy D. Vu
(74) Attorney, Agent, or Firm—Douglas L. Weller

(57) ABSTRACT

A first device detects whether a second device implements full duplex communication. When the first device begins receiving a network packet from the second device, the first device transmits a jam signal to the second device. When transmission of the network packet from the second device to the first device has been completed, the first device determines whether a check value within the network packet is valid. When the check value is valid, the first device recognizes that the second device implements full duplex communication. When the check value is not valid, the first device recognizes that the second device does not implement full duplex communication.

23 Claims, 3 Drawing Sheets

AUTOMATIC DETECTION OF FULL OR HALF DUPLEX CAPABILITY IN A REMOTE NETWORK DEVICE

BACKGROUND

The present invention concerns data transfer over a network and pertains particularly to automatic detection of full or half duplex capability in a remote network legacy ethernet node.

Full duplex mode in networks that operate in accordance with the ethernet network protocol is a mode of data transmission that supports duplex transmission as defined in IEEE Std 610.7-1995. Full duplex allows simultaneous communication between two nodes over a point-to-point medium. Unlike half duplex transmission, where only one node transmits data at a time, full duplex operation does not require carrier sense to be monitored for any transmission. For full duplex transmission to happen, both nodes need to be capable of full duplex operation over a point-to-point link.

The IEEE 802.3 standard defines technology for carrier sense multiple access with collision detection (CSMA/CD) access method and physical layer specifications. The IEEE 802.3u standard defines technology for 100 megabits per second networking. Within the physical sublayer (PHY), as defined in Clauses 24 and 25 of the specification IEEE 802.3u-1995, there is a Physical Coding Sublayer (PCS), a Physical Media Access (PMA) sublayer, and a Physical Media Dependent (PMD) sublayer. The PCS defines how data is encoded and decoded, how the Carrier Sense (CS) and Collision Detection (CD) functions work, and the interface between higher and lower layers in the protocol specification. The PMA defines the mapping of code bits, generation of a control signal (link_status) which indicates the availability of the PMD, generation of control signals to the PCS that indicate Carrier Sense, Collision Detection and Physical Layer Errors, and clock recovery. The PMD defines the signaling method and the various physical parameters that are necessary to address the link's physical requirements.

IEEE standard 802.3u-1995 clause 28 defines a mechanism of auto-negotiation between two auto-negotiation capable nodes to detect the capabilities of each other. The capabilities are advertised by the nodes through link pulses. Once the nodes have auto-negotiated they can configure themselves to the highest common capability supported by both nodes. However, for nodes which do not support auto-negotiation, there is no other automatic mechanism for allowing nodes to detect the capabilities of each other and configure themselves to the highest common capability supported by both nodes.

As per the IEEE 802.3u standard, the minimum capability of any node is to support 10 Megabits data transfer in half duplex. Using auto-negotiation, the nodes configure themselves to operate in full duplex if both nodes know each other's capabilities. However, if a node does not support auto-negotiation through link pulses, the node may not have any knowledge of the other node's capability. Therefore, the node cannot auto-configure to run in full duplex mode even if both nodes have the ability to run in full duplex. In order to run the link between two full duplex capable nodes in full duplex mode, both nodes need to be set manually through a console. This requires a central processing unit (CPU) to be present within each node. However, if a node is built without a CPU or console interface, another mechanism is needed to manually set the node's duplex mode. This can be accomplished by a hardware switch provided at the front plane. However, use of such a switch can be tedious and not user friendly.

BRIEF SUMMARY OF THE INVENTION

In accordance with the preferred embodiment of the present invention, a first device detects whether a second device implements and is configured in full duplex communication. When the first device begins receiving a network packet from the second device, the first device transmits a jam signal to the second device. When transmission of the network packet from the second device to the first device has been completed, the first device determines whether a check value within the network packet is valid. When the check value is valid, the first device recognizes that the second device implements and is configured in full duplex communication. When the check value is not valid, the first device recognizes that the second device does not implement full duplex communication.

In the preferred embodiment, a state machine within the first device controls the process. The state machine includes various states. In a first (XMIT_JAM) state, a jam signal is transmitted from the first device to the second device. The XMIT_JAM state is entered when the first device is receiving a network packet from the second device.

A second (SET_MODE) state is entered from the XMIT_JAM state when transmission of the network packet from the second device to the first device has been completed. In the SET_MODE state, the state machine recognizes the second device implements full duplex communication when a check value within the network packet is valid.

In a third (WAIT) state, the first device waits to receive a network packet from the second device. The state machine transitions from the WAIT state to the XMIT_JAM state when the first device is receiving a network packet from the second device.

The state machine enters a fourth (XMIT) state from the WAIT state when the first device has a transmission packet to be sent to the second device. The first device transmits the transmission packet while the state machine is in the XMIT state. The state machine transitions from the XMIT state to the WAIT state when the transmission packet has been successfully sent to the second device.

The state machine enters a fifth (XMIT_TX_JAM) state from the XMIT state when the first device begins receiving a network packet from the second device. When the state machine is in the XMIT_TX_JAM state, the first device aborts the transmission packet and transmits a jam signal to the second device.

The state machine enters a sixth (SET_TX_MODE) state from the XMIT_TX_JAM state when transmission of the network packet from the second device to the first device has been completed. In the SET_MODE state, the state machine recognizes the second device implements full duplex communication when a check value within the network packet is valid.

The state machine enters a seventh (SEND_CURRENT) state from the SET_TX_MODE state. When the state machine is in the SEND_CURRENT state, the transmission which was aborted in the XMIT_TX_JAM state is performed. If the variable DUPLEX_Mode is equal to the constant HALF, transmission is done based on CSMA/CD.

The state machine enters a STOP state from the SET_MODE state or from the SEND_CURRENT state. In the STOP state the state machine detection is complete.

In an initial (START) state, before entering the WAIT state, the state machine initiates values which indicate the second device does implement half duplex communication and the state machine detection is not complete.

DETAILED DESCRIPTION OF THE PREFERRED EMBODIMENT

Figure 1:
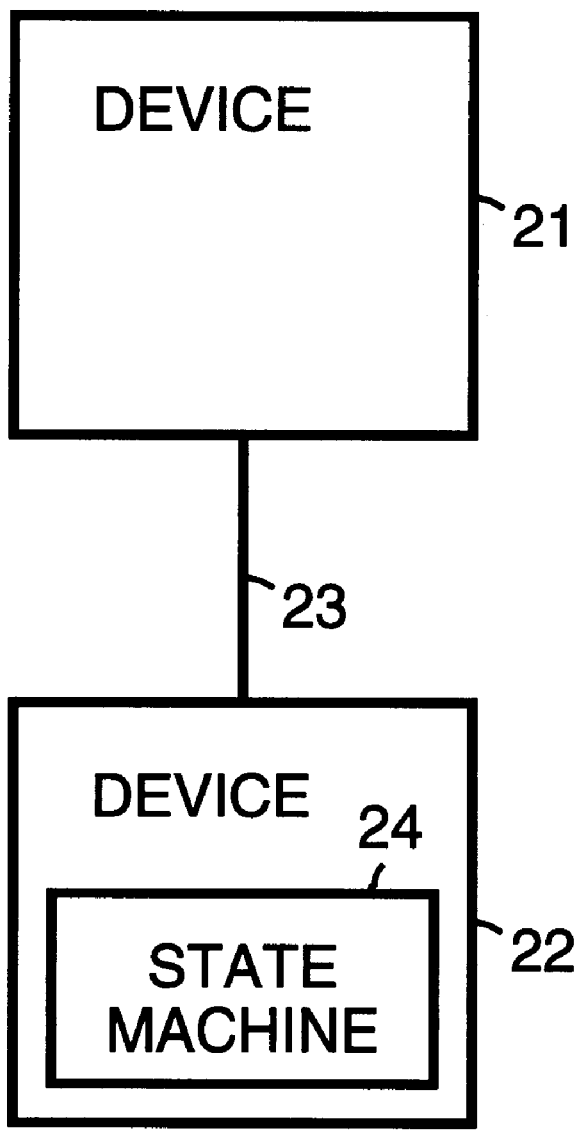
FIG. 1 shows, included within a network node, a state machine for providing the network node with the capability to automatically detect whether another shown node has full or half duplex capability, in accordance with a preferred embodiment of the present invention.

FIG. 1 shows a device (network node) 21 connected to a device (network node) 22 through a transmission medium 23. Device 22 includes a state machine 24 which implements automatic detection of whether device 21 has full or half duplex capability.

Figure 2:
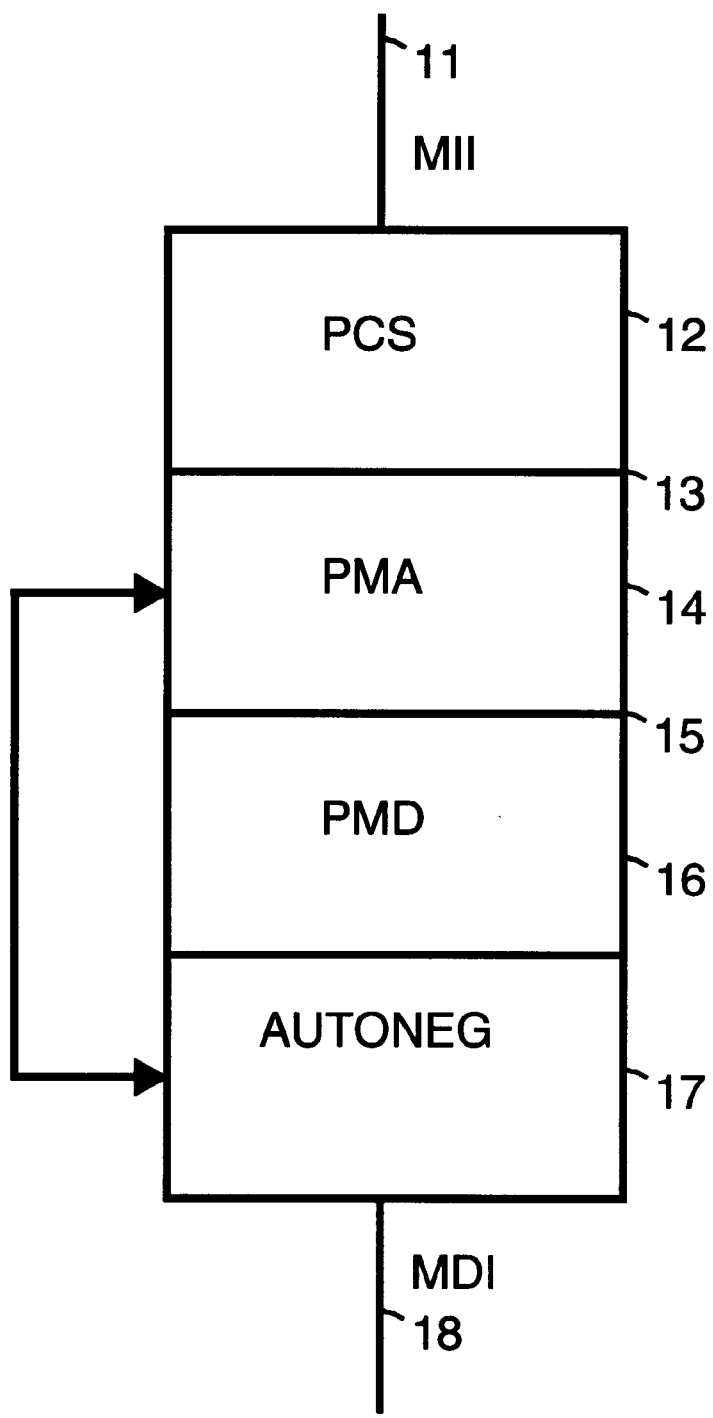
FIG. 2 is a simplified block diagram which shows auto-negotiation added to the organization of sublayers within a physical sublayer (PHY), as defined in Clause 28 of the specification IEEE 802.3u-1995.

FIG. 2 is a simplified block diagram which shows an auto-negotiation (AUTONEG) feature 17 added to the organization of sublayers within a physical sublayer (PHY), as defined in Clause 28 of the specification IEEE 802.3u-1995.

A Physical Coding Sublayer (PCS) 12 defines how data is encoded and decoded, how the Carrier Sense (CS) and Collision Detection (CD) functions work, and the interface between higher and lower layers in the protocol specification. A Physical Media Access (PMA) sublayer 14 defines the mapping of code bits, generation of a control signal (link_status) which indicates the availability of a Physical Media Dependent (PMD) sublayer 16, generation of control signals to the PCS that indicate Carrier Sense, Collision Detection and Physical Layer Errors, and clock recovery. Physical Media Dependent (PMD) sublayer 16 defines the signaling method and parameters for the various physical parameters that are necessary to address the link's physical requirements.

Physical Coding Sublayer (PCS) 12 uses a media independent interface (MII) 11 as a service interface to transfer information to and from a media access control (MAC) (via a Reconciliation sublayer) or another PCS client, such as a repeater. Further definition of MII 11 is given in Clause 22 of the specification IEEE 802.3u-1995.

A Media Dependent Interface (MDI) 18 provides the actual attachment, including connectors, to transmission medium 23, or other supported media.

PMA 14 communicates with PCS 12 through a PMA service interface 13. PMD 16 communicates with PMA 14 through a PMD service interface 15.

Auto-negotiating feature 17 communicates with PMA sublayer 14 through PMA service interface 13. The specific messages used, PMA_LINK.request and PMA_LINK.indicate are further described in the specification IEEE 802.3u-1995. In the preferred embodiment of the present invention, state machine 24 resides in PMA 14.

Figure 3:
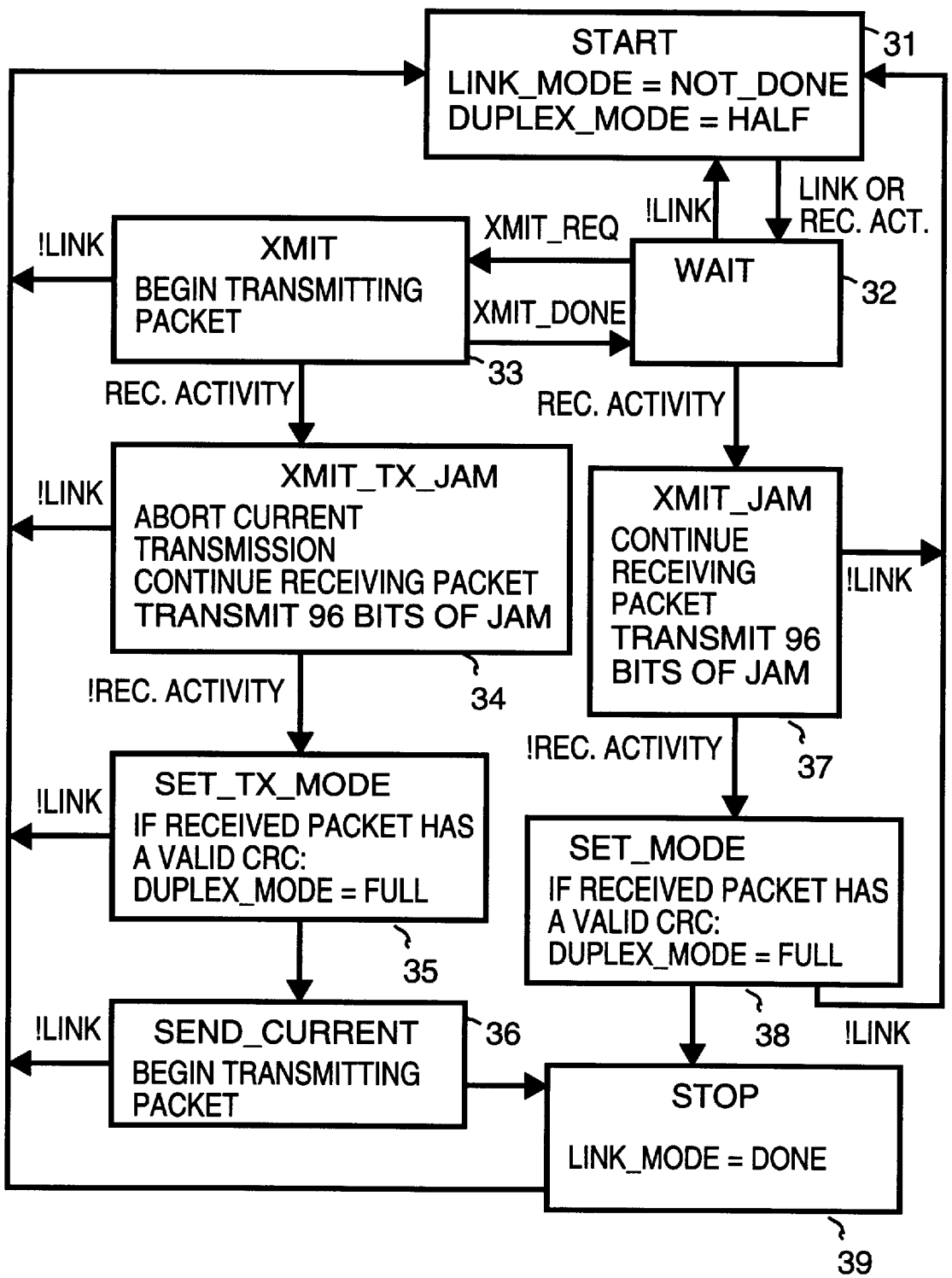
FIG. 3 is a state diagram for the state machine shown in FIG. 1 in accordance with a preferred embodiment of the present invention.

FIG. 3 shows a state diagram for state machine 24. The operation of state machine 24 enables device 22 to set duplex mode automatically, without human intervention, even though one or both of device 21 and device 22 do not support auto-negotiation, or when auto-negotiation for one or both of device 21 and device 22 is disabled. State machine 24 monitors the response of device 21 to certain transmit activity and depends on the adherence of the operation of device 21 to the IEEE 802.3u standard. State machine 24 is activated only when normal auto-negotiation, as described in the IEEE 802.3u standard, is unused or unsuccessful.

When state machine 24 is activated, state machine 24 enters a START state 31 at the power up of device 22. Also, when state machine 24 is activated, state machine 24 enters START state 31 whenever a link is lost between device 21 and device 22. State machine 24 detects whether device 21 is able to operate in full duplex mode.

In START state 31, state machine 24 sets the variable LINK_Mode to the constant NOT_DONE. State machine 24 also sets the variable DUPLEX_Mode to the constant HALF.

When device 22 receives link pulses, or detects receive activity from device 21, state machine 24 transitions from START state 31 to a WAIT state 32.

If while state machine 24 is in WAIT state 32, receive activity continues (i.e., a network packet of data is sent from device 21 to device 22), state machine 24 transitions from WAIT state 32 to a transmit jam (XMIT_JAM) state 37. In XMIT_JAM state 37, device 22 transmits 96 bits of JAM signal as defined in the IEEE 802.3 standard, to device 21. During transmission of the 96 bits of JAM signal, device 22 continues to receive the network packet from device 21.

When the receive activity ceases (i.e., the network packet of data is no longer being sent from device 21 to device 22), state machine 24 transitions from XMIT_JAM state 37 to a SET_MODE state 38.

In SET_MODE state 38, if the network packet received by device 22 has a valid Cyclic Redundancy Check (CRC) which is in accordance with IEEE standard 802.3, state machine 24 sets the DUPLEX_Mode to the constant FULL. If the network packet received by device 22 does not have a valid Cyclic Redundancy Check (CRC) which is in accordance with IEEE standard 802.3, state machine 24 leaves the DUPLEX_Mode set to the constant HALF. State machine 24 than transitions from SET_MODE state 38 to a STOP state 39.

In STOP state 39, state machine 24 sets variable LINK_Mode to the constant DONE. Device 22 then starts executing the normal transmit and receive state machines as defined in the IEEE standard 802.3. If the variable DUPLEX_Mode is equal to the constant FULL, then device 22 transmits data as a full duplex node without regard to Carrier Sense or Collision signal. If the variable DUPLEX_Mode is equal to the constant HALF, then device 22 transmits data as a half duplex node by monitoring Carrier sense and Collision signal and implementing normal CSMA/CD protocol of the IEEE 802.3 standard.

While in WAIT state 32, if there is a request from an upper network layer of device 21 to transmit a network packet, state machine 33 transitions from WAIT state 33 to a transmit (XMIT) state 33. In XMIT state 33 device 22 starts transmitting the network packet to device 21. If the network packet is fully transmitted and there is no receive activity, then state machine 24 transitions from XMIT state 33 back to WAIT state 32.

If while state machine 24 is in XMIT state 33, device 22 detects receive activity from device 21 (i.e., a network packet of data is sent from device 21 to device 22), state machine 24 transitions from XMIT state 33 to a transmit transmission jam (XMIT_TX_JAM) state 34. In XMIT_TX_JAM state 34, device 22 aborts transmission of the network packet being sent from device 22 to device 21. Device 22 then transmits 96 bits of JAM signal as defined in the IEEE 802.3 standard, to device 21. During transmission of the 96 bits of JAM signal, device 22 continues to receive the network packet from device 21.

When the receive activity ceases (i.e., the network packet of data is no longer being sent from device 21 to device 22), state machine 24 transitions from XMIT_TX_JAM state 34 to a SET_TX_MODE state 35.

In SET_TX_MODE state 35, if the network packet received by device 22 has a valid Cyclic Redundancy Check (CRC) which is in accordance with IEEE standard 802.3, state machine 24 sets the DUPLEX_Mode to the constant FULL. If the network packet received by device 22 does not have a valid Cyclic Redundancy Check (CRC) which is in accordance with IEEE standard 802.3, state machine 24 leaves the DUPLEX_Mode set the constant HALF. State machine 24 than transitions from SET_TX_MODE state 35 to a SEND_CURRENT state 36.

When state machine 24 is in SEND_CURRENT state 36, device 22 transmits the network packet that was aborted in XMIT_TX_JAM state 34. If the variable DUPLEX_Mode is equal to the constant FULL, then device 22 transmits the network packet as a full duplex node without regard to Carrier Sense or Collision signal. If the variable DUPLEX_Mode is equal to the constant HALF, then device 22 transmits the network packet as a half duplex node by monitoring Carrier sense and Collision signal and implementing normal CSMA/CD protocol of the IEEE 802.3 standard. When transmission of the network packet has been completed, state machine 24 transitions from SEND_CURRENT state 36 to STOP state 39.

If when in WAIT state 32, XMIT_JAM state, SET_MODE state, STOP state 39, XMIT state 33, XMIT_TX_JAM state 34, SET_TX_MODE state 35 or SEND_CURRENT state 36 the link between device 21 and 22 is lost, state machine 24 returns to START state 31. Also, within any state of the normal Receive state machine and the transmit state machine, as defined by the IEEE 802.3 standard, if the link between device 21 and 22 is lost, state machine 24 returns to START state 31.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method by which a first device detects whether a second device implements full duplex communication, comprising the following steps:
   (a) when the first device begins receiving a network packet from the second device, start transmitting a jam signal from the first device to the second device;
   (b) when transmission of the network packet from the second device to the first device has been completed, determining whether a check value within the network packet is valid; and,
   (c) when in step (b) the check value is valid, indicating that the second device implements full duplex communication.

2. A method as in claim 1 additionally comprising the following steps:

(d) when in step (c) the check value is not valid, indicating that the second device does not implement full duplex communication.

3. A method as in claim 1 wherein in step (b) the check valid is a Cyclic Redundancy Check (CRC).

4. A method as in claim 1 wherein step (a) includes, aborting any transmission from the first device to the second device when the first device begins receiving the network packet from the second device.

5. A method as in claim 4 additionally comprising the following step:
   (d) when in step (a) a transmission from the first device to the second device has been aborted, performing the transmission after completion of step (c).

6. A state machine within a first device which detects whether a second device implements full duplex communication, the state machine comprising:
   a first state in which a jam signal is transmitted from the first device to the second device, the first state being entered when the first device is receiving a network packet from the second device; and,
   a second state, entered from the first state when transmission of the network packet from the second device to the first device has been completed, in which, when a check value within the network packet is valid, the state machine recognizes the second device implements full duplex communication.

7. A state machine as in claim 6 additionally comprising:
   a third state, entered from the second state, in which it is indicated that the state machine detection is complete.

8. A state machine as in claim 6 additionally comprising:
   a third state, in which the state machine waits for the first device to receive a network packet from the second device, the state machine transitioning from the third state to the first state when the first device is receiving a network packet from the second device.

9. A state machine as in claim 8 additionally comprising:
   a fourth state which is entered from the third state when the first device has a packet transmission to be sent to the second device, the packet transmission being sent in the fourth state, and the state machine transitioning from the fourth state to the third state when the packet transmission has been successfully sent to the second device.

10. A state machine as in claim 9 additionally comprising:
    a fifth state, entered from the fourth state when the first device begins receiving a network packet from the second device, the first device aborting the packet transmission and transmitting a jam signal to the second device when the state machine is in the fifth state.

11. A state machine as in claim 10 additionally comprising:
    a sixth state, entered from the fifth state when transmission of the network packet from the second device to the first device has been completed, in which, when a check value within the network packet is valid, the state machine recognizes the second device implements full duplex communication.

12. A state machine as in claim 11 additionally comprising:
    a seventh state, entered from the sixth state, the first device performing the packet transmission which was aborted in the fifth state.

13. A state machine as in claim 6 additionally comprising:
    a third state in which the values are initiated which indicate the second device does implement half duplex communication and the state machine detection is not complete.

14. A first device which is connectable to a second device through a network link, the first device comprising:
- a state machine which detects whether the second device implements full duplex communication, the state machine comprising:
  - a first state in which a jam signal is transmitted from the first device to the second device, the first state being entered when the first device is receiving a network packet from the second device, and
  - a second state, entered from the first state when transmission of the network packet from the second device to the first device has been completed, in which, when a check value within the network packet is valid, the state machine recognizes the second device implements full duplex communication.

15. A first device as in claim 14 wherein the state machine additionally comprises:
- a third state, entered from the second state, in which it is indicated that the state machine detection is complete.

16. A first device as in claim 14 wherein the state machine additionally comprises:
- a third state, in which the state machine waits for the first device to receive a network packet from the second device, the state machine transitioning from the third state to the first state when the first device is receiving a network packet from the second device.

17. A method by which a state machine within a first device detects whether a second device implements full duplex communication, method comprising the following steps:
- (a) entering a first state when the first device is receiving a network packet from the second device;
- (b) transmitting a jam signal from the first device to the second device when the state machine is in the first state;
- (c) entering a second state from the first state when transmission of the network packet from the second device to the first device has been completed; and,
- (d) recognizing the second device implements full duplex communication when, in the second state, a check value within the network packet is valid.

18. A method as in claim 17 additionally comprising the following steps:
- (e) entering a third state from the second state; and,
- (f) in the third state, indicating that the state machine detection is complete.

19. A method as in claim 17 additionally comprising the following steps:
- (e) in a third state, waiting for the first device to receive a network packet from the second device; and,
- (f) transitioning from the third state to the first state when the first device is receiving a network packet from the second device.

20. A method as in claim 19 additionally comprising the following steps:
- (g) entering a fourth state from the third state when the first device has a transmission packet to be sent to the second device;
- (h) transmitting the transmission packet while the state machine is in the fourth state; and,
- (i) transitioning from the fourth state to the third state when the transmission packet has been successfully sent to the second device.

21. A method as in claim 20 additionally comprising the following steps:
- (j) entering a fifth state from the fourth state when the first device begins receiving a network packet from the second device; and,
- (k) causing the first device to abort the transmission packet and transmit a jam signal to the second device when the state machine is in the fifth state.

22. A method as in claim 21 additionally comprising the following steps:
- (l) entering a sixth state from the fifth state when transmission of the network packet from the second device to the first device has been completed; and,
- (m) recognizing the second device implements full duplex communication when, in the sixth state, a check value within the network packet is valid.

23. A method as in claim 22 additionally comprising the following steps:
- (n) entering a seventh state from the sixth state; and,
- (o) performing, when the state machine is in the seventh state, the transmission which was aborted in the fifth state.

* * * * *